United States Patent
Messely et al.

(10) Patent No.: US 9,197,866 B2
(45) Date of Patent: Nov. 24, 2015

(54) METHOD FOR MONITORING A TRAFFIC STREAM AND A TRAFFIC MONITORING DEVICE

(71) Applicants: Pieter Messely, Wevelgem (BE); Wouter Favoreel, Wevelgem (BE)

(72) Inventors: Pieter Messely, Wevelgem (BE); Wouter Favoreel, Wevelgem (BE)

(73) Assignee: FLIR Systems, Inc., Wilsonville, OR (US)

( * ) Notice: Subject to any disclaimer, the term of this patent is extended or adjusted under 35 U.S.C. 154(b) by 366 days.

(21) Appl. No.: 13/874,393

(22) Filed: Apr. 30, 2013

(65) Prior Publication Data
US 2013/0300870 A1     Nov. 14, 2013

(30) Foreign Application Priority Data
Apr. 30, 2012 (EP) .................................. 12166237

(51) Int. Cl.
| H04N 7/18 | (2006.01) |
| G01S 7/295 | (2006.01) |
| G01S 7/40 | (2006.01) |
| G01S 13/86 | (2006.01) |
| G01S 13/92 | (2006.01) |
| G08G 1/04 | (2006.01) |

(52) U.S. Cl.
CPC .............. *H04N 7/183* (2013.01); *G01S 7/2955* (2013.01); *G01S 7/4026* (2013.01); *G01S 13/867* (2013.01); *G01S 13/92* (2013.01); *G08G 1/04* (2013.01)

(58) Field of Classification Search
CPC ......... H04N 7/183; H04N 7/18; H04N 7/188; G01S 7/2955; G01S 7/4026; G01S 13/867; G01S 13/92; G01S 13/931; G01S 15/931; G08G 1/04; G08G 1/00; G08G 1/16; G08G 1/164

USPC .......... 348/149, 148, 180; 346/107.2; 701/301
IPC ........................................................ H04N 7/18
See application file for complete search history.

(56) References Cited

U.S. PATENT DOCUMENTS

| 4,866,438 | A | 9/1989 | Knisch |
| 6,067,031 | A * | 5/2000 | Janky et al. ................... 340/903 |
| 7,706,978 | B2 | 4/2010 | Schiffmann et al. |
| 2010/0246897 | A1 | 9/2010 | Lehning |
| 2013/0151135 | A1* | 6/2013 | Aubrey et al. ................ 701/118 |

FOREIGN PATENT DOCUMENTS

DE            198 10 302            9/1999

* cited by examiner

*Primary Examiner* — Sherrie Hsia
(74) *Attorney, Agent, or Firm* — Haynes and Boone, LLP

(57) ABSTRACT

A traffic monitoring device may comprise a radar and a camera, the radar having a radar field of view extending around a radar central axis and the camera having a camera field of view extending around a camera central axis that are both situated in such a manner that the radar field of view is situated within the camera field of view. The radar and the camera may be positioned so that their a central axis of each field of view makes a predetermined angle with respect to the other, the radar being provided for determining coordinates of moving objects within the radar field of view. The device may comprise selecting means a processing unit to provided for selecting within the image an image section or portion, and a data processing unit to for transforming the coordinates of the moving object within the image portion into further coordinates relative to an image reference frame and for to displaying within the image portion an identifier at the further coordinates.

16 Claims, 6 Drawing Sheets

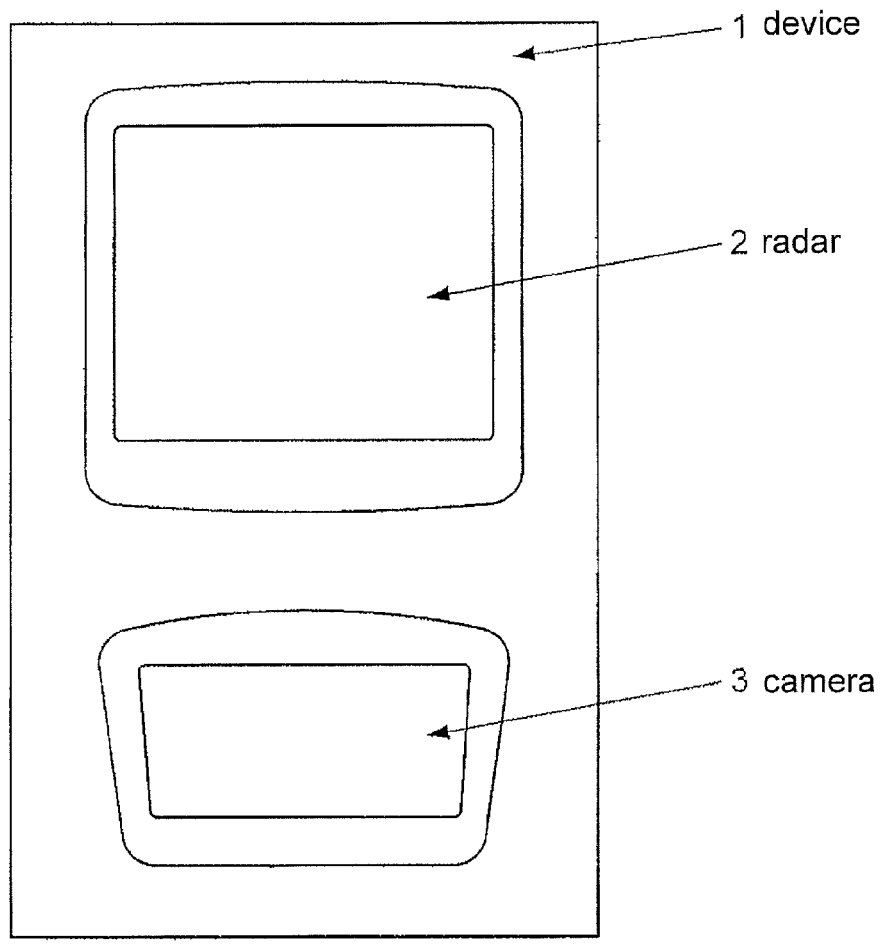
*Fig.1*
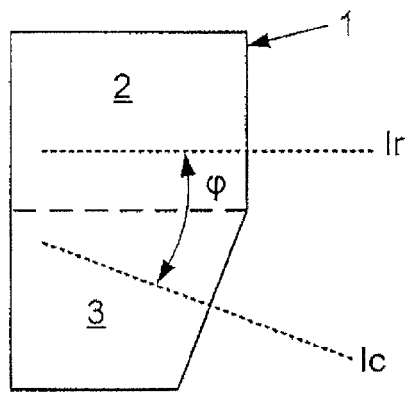 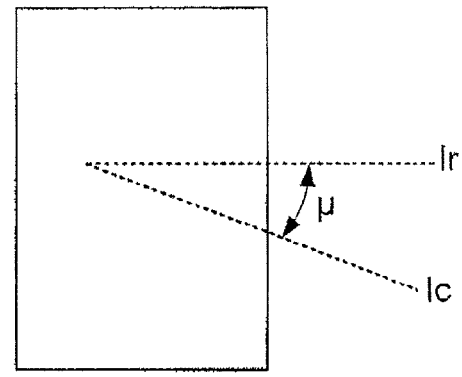
*Fig. 2A*     *Fig. 2B*

METHOD FOR MONITORING A TRAFFIC STREAM AND A TRAFFIC MONITORING DEVICE

CROSS-REFERENCE TO RELATED APPLICATIONS

This application claims the benefit of and priority to European Patent Application No. 12166237.3 filed Apr. 30, 2012 and entitled "A TRAFFIC MONITORING DEVICE AND A METHOD FOR MONITORING A TRAFFIC STREAM", which is hereby incorporated by reference in its entirety.

TECHNICAL FIELD

One or more embodiments of the invention relate generally to traffic monitoring and more particularly, for example, to systems and methods for monitoring vehicular traffic streams.

BACKGROUND

Various types of traffic monitoring systems and methods are known. For example, a conventional traffic monitoring device comprises a laser and a camera which are both oriented towards a same part of a road. In order however that the camera and the laser monitor the same traffic stream, the field view of the laser is situated within the field of view of the camera. The known method enables one to produce a fixed spatial relationship between the laser and the camera based on the measured data.

A drawback of the known method is that the translational displacements and the rotational movements are carried out interactively thereby requiring an operator to execute the operation.

SUMMARY

Techniques are disclosed for systems and methods for monitoring traffic. One or more embodiments of the present disclosure relate to a method for monitoring a traffic stream circulating on a road, wherein video images of said traffic stream are recorded by means of a camera and further data measured from vehicles being part of said traffic are collected by means of a further measurement member. Said camera and said further measurement member may be located at a common location offset with respect to a central axis of said road. Said further measurement member may have a field of view extending around a further measurement member central axis, and said camera may have a camera field of view extending around a camera central axis. Said further measurement member may be set up in such a manner that its field of view is situated within the field of view of the camera, and said further measurement member may be oriented with respect to the camera so that their central axis of their field of view make a predetermined angle with respect to each other. Further measurement member coordinates of moving objects in a selected section or portion of said image may be determined by said further measurement member, and said further measurement member coordinates may be transformed into further coordinates of an image reference frame. An identifier may be displayed within said image portion at said further coordinates.

In one embodiment, a traffic monitoring method may be easily and nearly automatically implemented. For example, a traffic monitoring method implemented according to an embodiment of the present disclosure may be characterized in that the further measurement member is formed by a radar, and wherein said method comprises a calibration of said video images by setting camera parameters, in particular a focal distance of a camera lens of said camera, and scene parameters, in particular a height at which said camera is positioned with respect to said road. Said calibration may further comprise a selection of an image of said video images and a determination within said selected image of a horizon in an environment in which said road extends followed by drawing in said selected image of a substantially horizontal line at said horizon, based on said horizontal line, said camera parameters and said scene parameters, a reference frame for pixels composing said selected image being determined, an orientation angle indicating an angle between an axis extending along said road and a central axis of a radar beam emitted by said radar being determined by sampling subsequent positions on said road reached by a vehicle of said traffic stream travelling on said road, a line extending substantially vertically within a further selected image of said video images being drawn and coordinates for said line within said reference frame being determined, said line being thereafter rotated within said further selected image over an angle corresponding to said orientation angle.

By using a radar and a camera, an improved monitoring is obtained, as the radar is capable of collecting data which is far remote from the place where the radar is located, whereas the camera is more suitable to collect data in the neighborhood of the place where it is located. The fact that the central axis of the radar and the camera field of views are at predetermined angles enables to have the camera looking at a different angle to the traffic than the radar.

The selecting means and the transforming means enable to select a section of the image and to transform radar data from the selected image portion into the image, without on-site calibration of the camera and the radar. The determination of a horizon in a selected image enables to establish a reference frame in the selected image, as the horizon can be unambiguously determined. Once this reference frame is determined it becomes possible to attribute coordinates to the pixels composing the selected image.

As moreover the radar is offset with respect to the road on which the traffic circulates, the traffic does not move parallel to a central axis of the radar beam and the central axis of the radar beam is rotated over an angle, called orientation angle, with respect to the central axis of the road. This orientation angle is determined by sampling subsequent positions on the road reached by a vehicle travelling on the road. In such a manner the orientation angle is determined automatically from the sampled radar data.

In order to match the radar data with the video data a vertical line is drawn in a further image. As the reference frame is determined, it is possible to determine the coordinates of this line. With the knowledge of the orientation angle it is possible to rotate the vertical line over the orientation angle to become the position of the central axis in the video image. In such a manner the calibration of the radar and the camera is automatically and reliably realized.

In one embodiment, a method according to the present disclosure is characterized in that said sampled subsequent positions (p1, p2, .pj, .pn) are situated on a road axis substantially parallel to said central axis, said sampling being executed at a predetermined sampling frequency, for each sampled position $pj(j \neq 1)$ a first ($\Delta sj$) and a second ($\Delta s'j$) distance being determined on the basis of a speed at which said sampled vehicle moves and said sampling frequency, whereas said first distance extends on said central axis of said radar beam and said second distance extends on said road axis, said orientation angle being determined on the basis of said first and second distances. As the radar measures a speed and as the sampling frequency is known, the distances can be easily and reliably determined. These distances can enable to determine the orientation angle.

Embodiments of the present disclosure may also relate to a traffic monitoring device comprising a radar module and a camera lodged in a housing, said radar having a radar field of view extending around a radar central axis and said camera having a camera field of view extending around a camera central axis. Said camera may be provided to form an image of objects situated within said camera field of view, said camera field of view being larger than said radar field of view, said radar and said camera being mounted with respect to each other in such a manner that said radar field of view is situated within said camera field of view.

Said radar and said camera may be, when operational, rigidly mounted with respect to each other, and wherein the radar and the camera are positioned with respect to each other so that their central axis of their field of view make a predetermined angle with respect to each other, said radar being provided for determining, with respect to a radar coordinates reference frame, coordinates of moving objects within said radar field of view. Said device may comprise selecting means provided for selecting within said image an image section representing at least part of said radar field of view. Said device may further comprise transformation means coupled to said selection means and provided for transforming said coordinates of said moving object within said image portion into further coordinates relative to an image reference frame, and for displaying within said image portion an identifier at said further coordinates.

Said device may comprise calibration means provided for calibrating said video images by setting camera parameters, in particular a focal distance of a camera lens of said camera, and scene parameters, in particular a height at which said camera is positioned with respect to said road. Said calibration means may further comprise further selection means provided for selecting an image within said video images and for determining within said selected image a horizon in an environment in which said road extends, and for drawing in said selected image of a substantially horizontal line at said horizon. Said calibration means may be further provided for determining, based on said horizontal line, a reference frame for pixels composing said selected image on the basis of said camera parameters and said scene parameters, and for determining an orientation angle indicating an angle between an axis extending along said road and a central axis of a radar beam emitted by said radar by sampling subsequent positions on said road reached by a vehicle of said traffic stream travelling on said road. Said calibration means may be further provided for drawing a line extending substantially vertically within a further selected image of said video images and coordinates for said line within said reference frame, and for rotating thereafter said line within said further selected image over an angle corresponding to said orientation angle.

A device according to one embodiment of the disclosure may be characterized in that said reference frame of said radar is a world coordinates reference frame. This enables to work with a reliable reference frame which some radar even have installed upon manufacturing.

A device according to another embodiment of the disclosure may be characterized in that said predetermined angle is situated within −21° to 14° when in a vertical plane of said image and within −10° and 10° when in a horizontal plane of said image. The range enables one to cover for straight roads and bended roads.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 illustrates an overall view of a device in accordance with an embodiment of the disclosure.

FIGS. 2a-2f illustrate a field of view of a camera and a radar, as well as their relative positions, in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

The invention will now be described with reference to the annexed drawings showing one or more embodiments of the invention.

For the sake of clarity, embodiments of the invention will be described with reference to a traffic road on which vehicles like cars and trucks travel. However the embodiments are not limited to be used for roads formed by streets on which vehicles formed by cars and trucks travel. The terms "vehicle and road" will cover on the one hand all kind of vehicles such as cars, trucks, motorbikes or bicycles travelling on different kind of roads such as high ways or local ways, and on the other hand vehicles such as boats travelling on water channels.

FIG. 1 shows an overall view of a device 1 according to an embodiment of the present disclosure. The device comprises a radar 2 and a camera 3, which is for example formed by a CCD camera. The radar and the camera may be lodged in a same housing so as to enable a single mounting. The radar and the camera may be at a common location. The radar may be lodged in the upper part and the camera in the low part.

Figure 2C:
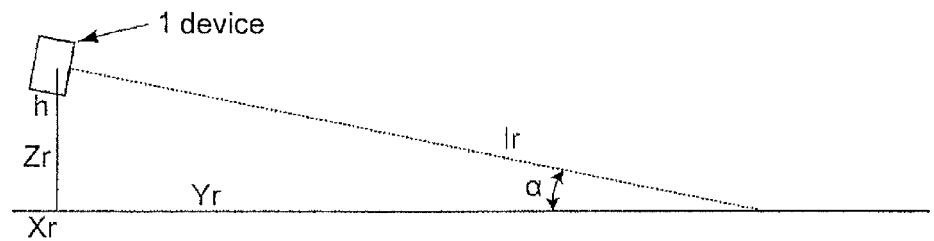
Figure 2D:
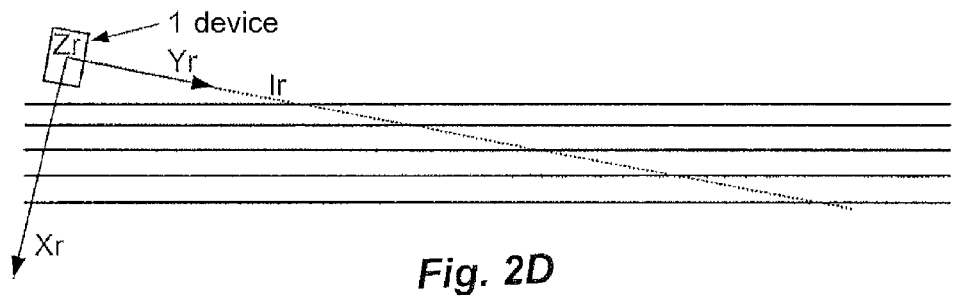

FIG. 2a illustrates the radar central axis lr and the camera central axis lc. As can be seen from FIGS. 2 a+b the radar and the camera are so oriented with respect to each other, that their respective central axis make a predetermined angle with respect to each other. It should be noted that the central axis of the radar may coincide with the central axis of the housing in which the radar and the camera are housed. FIG. 2a illustrates a lateral view whereas FIG. 2b illustrates a top view. In a vertical plane the central axes make an angle φ with respect to each other, which angle may be situated in a range $-21°≤φ<14°$, and may be, in particular, $φ=-21°$, whereas the angle μ in the horizontal plane may be situated in the range $-10°≤μ≤10°$, and may be, in particular, $μ=10°$. FIG. 2c illustrates the central axis of the radar in its field of view. With respect to the road to be monitored and considered in the vertical plane, the radar central axis lr makes an angle α with respect to the road. The device 1 is placed at a height h expressed, in one embodiment, in world coordinates, which is the reference frame of the radar. FIG. 2d illustrates the same radar central axis, but now in a horizontal plane.

Figure 2E:
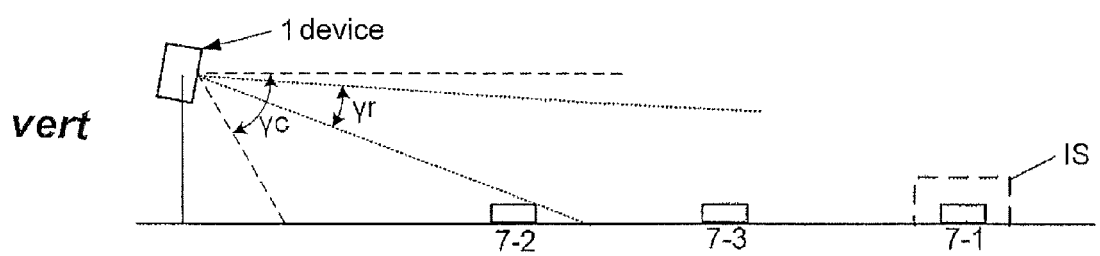
Figure 2F:
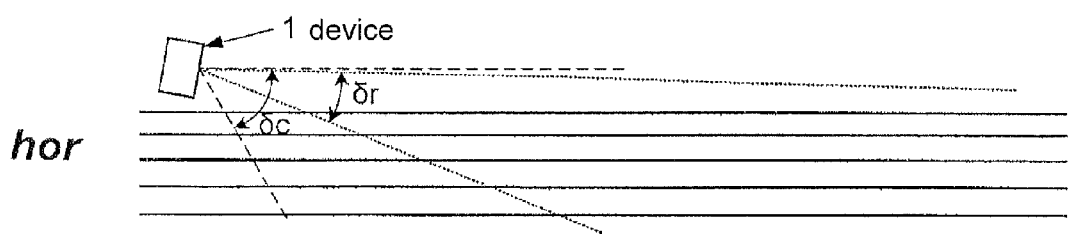

FIGS. 2e and f illustrate the field of view of the radar and the camera, where FIG. 2e illustrates the vertical plane and FIG. 2f the horizontal plane. The camera has a vertical view angle γc and a horizontal view angle δc, and also the radar has a vertical view angle γr and a horizontal view angle δr. The field of view of the camera is chosen in such a manner that the field of view of the radar is completely within the field of view of the radar. For this purpose the camera field of view is larger than the one of the radar. Therefore every object located in the field of view of the radar will also be in the field of view of the camera. The reason for this choice is that the radar is used to detect vehicles 7-1 which are at a larger distance from the device, whereas the camera is more suitable to detect vehicles 7-2 which are more closely to the device. By more closely it is understood, a range as from substantially 15m with respect to the location of the camera.

By choosing a large field of view for the camera, the camera doesn't need to be physically aligned to a particular region of interest. The region of interest can then be selected from the whole image field of the camera by digital zooming, panning and tilting of the camera image, without physically moving the camera. It is thus possible to have the camera and the radar fixed with respect to each other, which renders the configuration upon installing the device easier.

As the field of view of the radar is in the one of the camera, it becomes possible to map radar data into the images recorded by the camera and calibrate the radar. The accuracy of the data collected by the radar can be verified by projecting the radar data into the images recorded by the camera. To enable such verification, a transformation matrix is applied to the radar data. Such a transformation matrix is for example described in the chapters 8 and 9 (Epipolar geometry and the fundamental matrix) of the book "Multiple View Geometry in Computer Vision" (second edition) of Richard Hartley and Andrew Zisserman, published by Cambridge University Press in March 2004, which is hereby incorporated by reference in its entirety.

Referring back to FIG. 2e, one can see that vehicle 7-1 is in the radar and the camera field of view, whereas vehicle 7-2 leaves the radar field of view and only stays into the camera field of view. The device according to one embodiment comprises selecting means provided for selecting within the image recorded by the camera an image section representing at least part of the radar field of view. Those selecting means are for example formed by either a zoom or by selectively addressing the image memory where the image recorded by the camera is stored. In the example illustrated in FIG. 2e the image section IS where vehicle 7-1 is present can thus be selected.

The radar is provided for determining, with respect to a radar coordinates reference frame, coordinates of moving objects within the radar field of view. The radar can determine in its own reference frame the coordinates of vehicle 7-1. These coordinates may be provided in a world reference frame. When the image section IS, in which vehicle 7-1 is situated, is selected from the image recorded by the camera, the radar coordinates of the vehicle can be transformed into image coordinates by the transformation means of the device. The transformation means are for example realized by means of a data processing unit programmed for transforming the radar coordinates into image coordinates. Once this transformation has been realized, the vehicle 7-1, such as detected by the radar can be identified in the image, for example by displaying an identifier at the location in the image obtained by the radar coordinates transformation.

Figure 3:
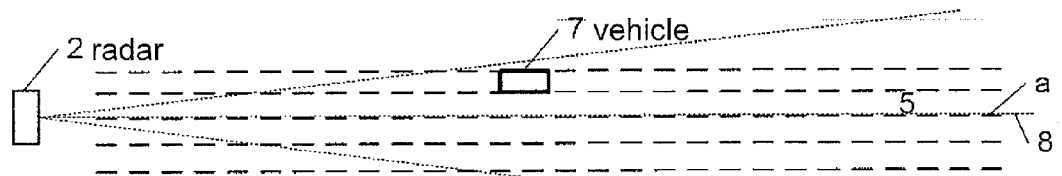
FIG. 3 illustrates a radar beam when the radar is perpendicular to a road in accordance with an embodiment of the disclosure.

As the device can generally not be placed on the road itself, as it would perturb the traffic, the device is generally located offset with respect to the central axis of the road. This however has consequences for the radar beam as illustrated in the FIGS. 3 and 4. In the set-up as illustrated in FIG. 3, the radar 2 is placed above the road 5 and the emitted radar beam 6 is parallel to the direction into which vehicles 7 circulate on the road. In such a manner, the central axis 8 of the radar beam corresponds to the central axis (a) of the road and the orientation angle between this central axis of the road and the one of the radar beam is equal to zero.

Figure 4:
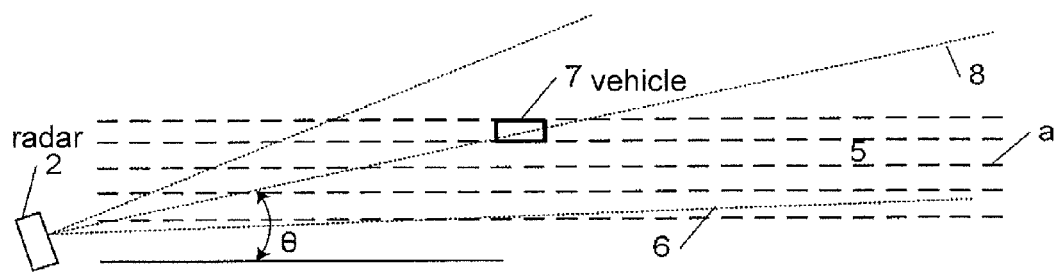
FIG. 4 illustrates a radar beam when the radar is offset with respect to a road in accordance with an embodiment of the disclosure.
Figure 5:
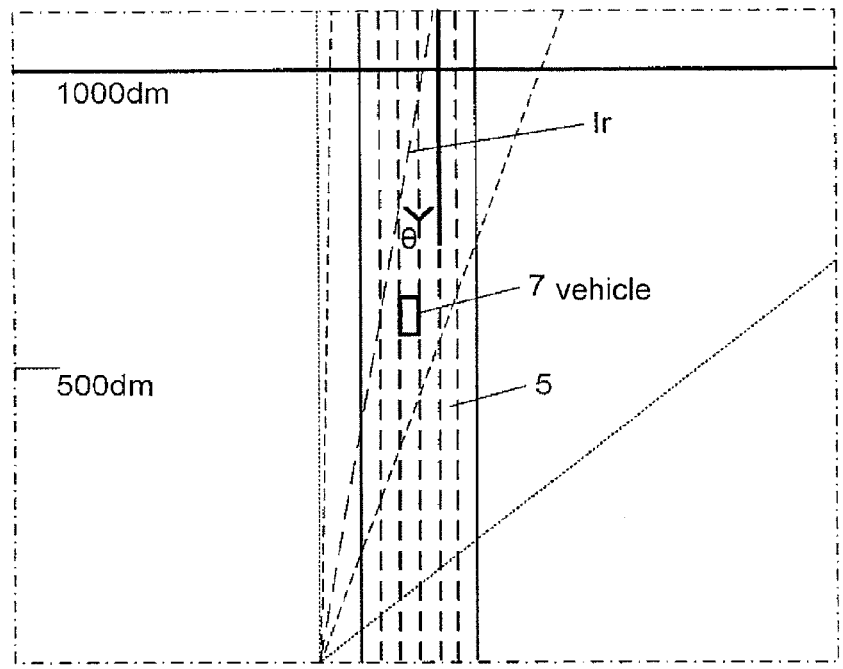
FIG. 5 illustrates a concept of an orientation angle in accordance with an embodiment of the disclosure.

In the set-up as illustrated in FIG. 4, the radar 2 is placed offset the road, i.e. along the road where no vehicles should be or at least should not circulate. The central axis 8 of the emitted radar beam 6 now makes an orientation angle θ which is different from zero. This will affect the measurements of the radar, if no calibration to the correct orientation angle is done. As illustrated in FIG. 5, a vehicle 7 will not move parallel to the radar beam, when the radar is offset with respect to a central axis of the road 5. Such calibrations of the radar may be performed manually, which is cumbersome and time consuming. Moreover, if the radar data have to be mapped on the image recorded by the camera, it is typically necessary to correctly determine the orientation angle, otherwise the mapping could be incorrect and the vehicle traced by the radar might not be put on the correct position in the image.

Figure 6:
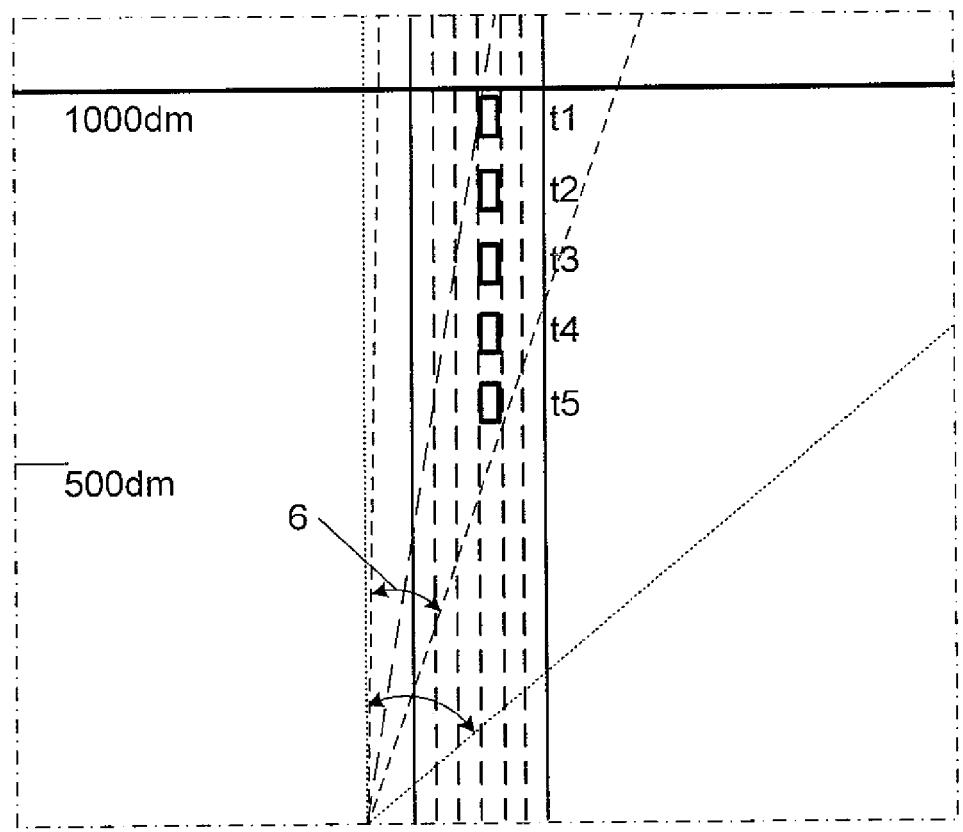
FIG. 6 illustrates a sampling of vehicles moving on a road in accordance with an embodiment of the disclosure.
Figure 7:
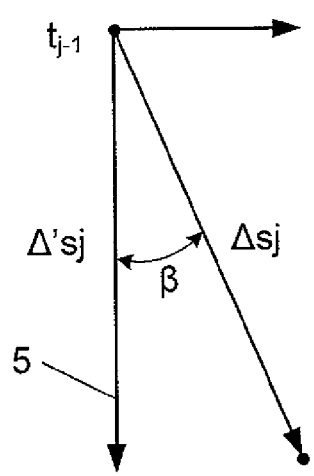
FIG. 7 illustrates how an orientation angle is determined on the basis of sampled data in accordance with an embodiment of the disclosure.

According to embodiments of the present disclosure, the determination of the orientation angle will be done by means of a data processing. As is illustrated in FIGS. 5 and 6, a vehicle 7 moving on the road 5 will at different times t1, t2, t3, t4, t5, be at different locations p1, p2, p3, p4, p5, . . . . As the vehicle moves within the radar beam 6, the subsequent locations at which the vehicle is on the road can be determined by the determination of their coordinates in the radar reference frame. By now sampling the movement of the vehicle on the road at a predetermined sampling frequency, a first distance Δsj covered by the vehicle between a position pj−1 at a time tj−1 and pj at a time tj can be determined, as illustrated in FIG. 7. Indeed, in a time interval Δt=tj−tj−1 the vehicle will have moved from a position pj−1 to a position pj.

As the sampling frequency is known, the time Δt is also known. In this time period the vehicle will have moved over the first distance Δsj, which first distance extends on the central axis lr/8 of the radar beam, because the radar measures with respect to its beam. In reality (e.g., as represented in images captured by the camera) the vehicle has moved over a second distance Δs'j=pj−pj−1 extending along the road axis 5. Δsj and Δs'j make an angle β with each other. By determining the coordinates in the radar reference frame of the locations pj−1 and pj and transforming them into image coordinates, the transformed coordinates can be displayed in the image.

As the radar makes an angle β with respect to the camera, the transformed coordinates will not be displayed on the location where the vehicle is in reality (e.g., as represented in images captured by the camera). As illustrated in FIG. 7, the image will show the vehicle on Δs'j, whereas the radar coordinates will show the vehicle on Δsj. From this difference in the positions the angle β can now be determined. The angle β now corresponds to the orientation angle of the radar beam. In such a manner, the orientation angle is determined by data processing and not by measurement by a human being. In one embodiment, at least two subsequent positions are sampled. Nevertheless, in order to increase the reliability of the calibration, and in another embodiment, at least twenty samples are sampled. The orientation angles σ determined at each of the n samplings are then averaged.

Figure 8:
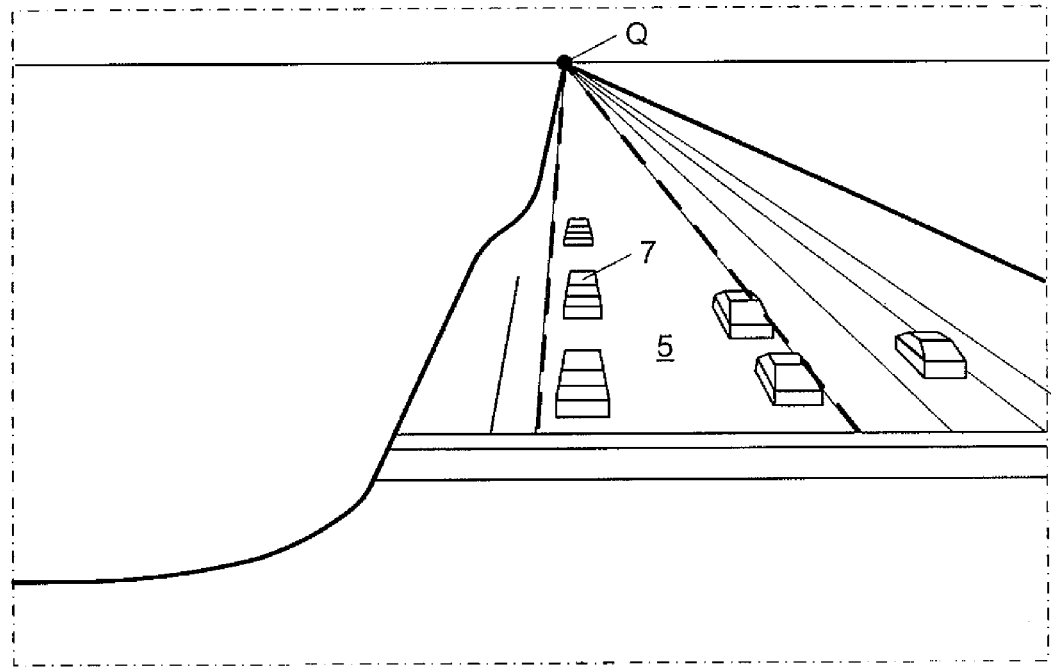
FIG. 8 illustrates a concept of a horizon in an image in accordance with an embodiment of the disclosure.

After determination of the orientation angle, the process may map the radar data into the images such as those recorded by the camera 3. In general, the camera may record two-dimensional images, whereas the road extends in a three-dimensional space. Thus, it is typically necessary to have a transformation of the two-dimensional pixel positions in the image to the three-dimensional world. For this transformation, one needs to know various camera parameters, such as the focal distance of the camera lens, and scene parameters, such as the height at which the camera is positioned with respect to the road and/or the vanishing point in the image. The camera parameters, like the focal distance, are known from the type of camera used. The scene parameter, such as the height at which the camera is positioned, is dependent from the actual scene, but is easily determined, such as during installation, for example, or through comparisons of imaged lengths to actual lengths. So there remains the vanishing point to be determined. The vanishing point Q, as illustrated in FIG. 8, is a two-dimensional point in the image wherein parallel lines in the real world join one another in the image. If only straight roads existed, the vanishing point could be easily determined using the lines of the road on the image. However, not all roads extend straight forward, and so the determination of the vanishing point is not always straight forward.

In one embodiment, a method proposes a radical deviation by no longer determining a vanishing point but by using a horizon in the image. Indeed, as the images concern a road, there will be a horizon of that road. Once the horizon is determined in the selected image, which may be an image of the road to be monitored and taken by the camera, and knowing the height at which the camera is mounted, as well as the focal distance of the lens, it is possible to define in said image a reference frame for the pixels composing the selected image and all further images taken by the camera. As the horizon has defined coordinates in a world frame, the coordinates of the reference frame may be expressed in world coordinates. More details relating to the mathematics of such a 2D-3D transformation are for example described in the referred book "Multiple View Geometry in computer vision" on the pages 25 to 85, which are incorporated herein by reference.

Figure 9:
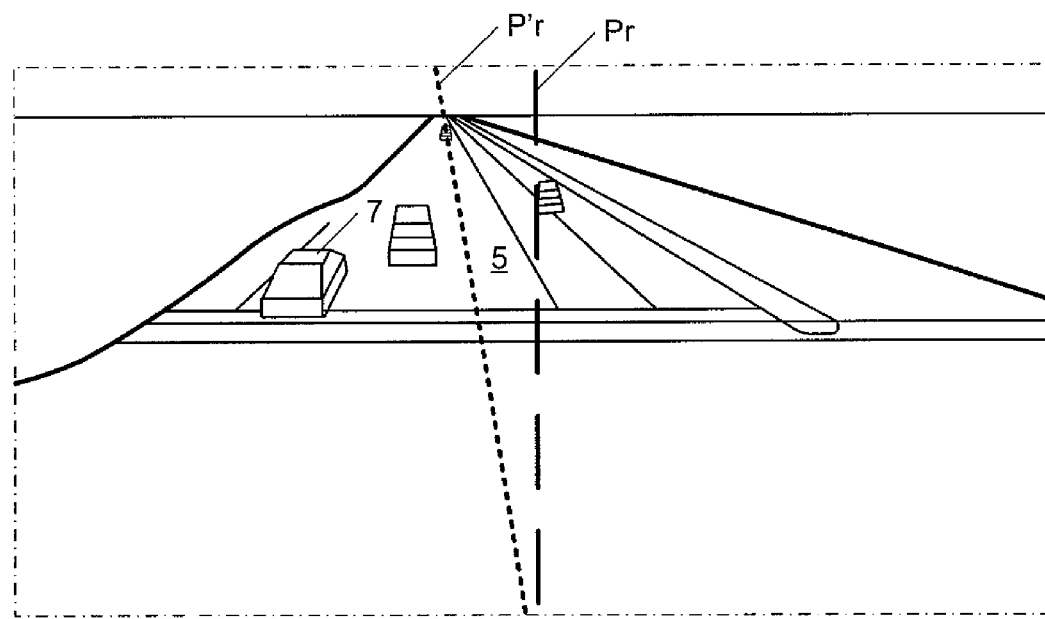
FIG. 9 illustrates how a line is drawn in an image in accordance with an embodiment of the disclosure.

Having now determined a reference frame for the images recorded by the camera, the next step is to bring the radar data also into those images. For this purpose a line pr extending substantially vertically within a further selected image of the video images recorded by the camera is drawn, as illustrated in FIG. 9. Of course, the further selected image, and the selected image in which the horizon is drawn may be the same. The line pr is, in one embodiment, drawn in the center of the image, but it will be clear that the line could also be drawn offset the center of the image. The use of the center of the image has the advantage that it corresponds with the central beam axis of the camera if the camera would be positioned perpendicular to the road to be monitored. The drawing of such a line in the further selected image can easily be realized by known means when the further image is shown on a display of a computer. As illustrated in FIG. 9, the vertical line pr may divide the further image in two equal parts. As the reference frame of the images is known, the coordinates of this line pr with respect to this reference frame can now be determined.

Figure 10:
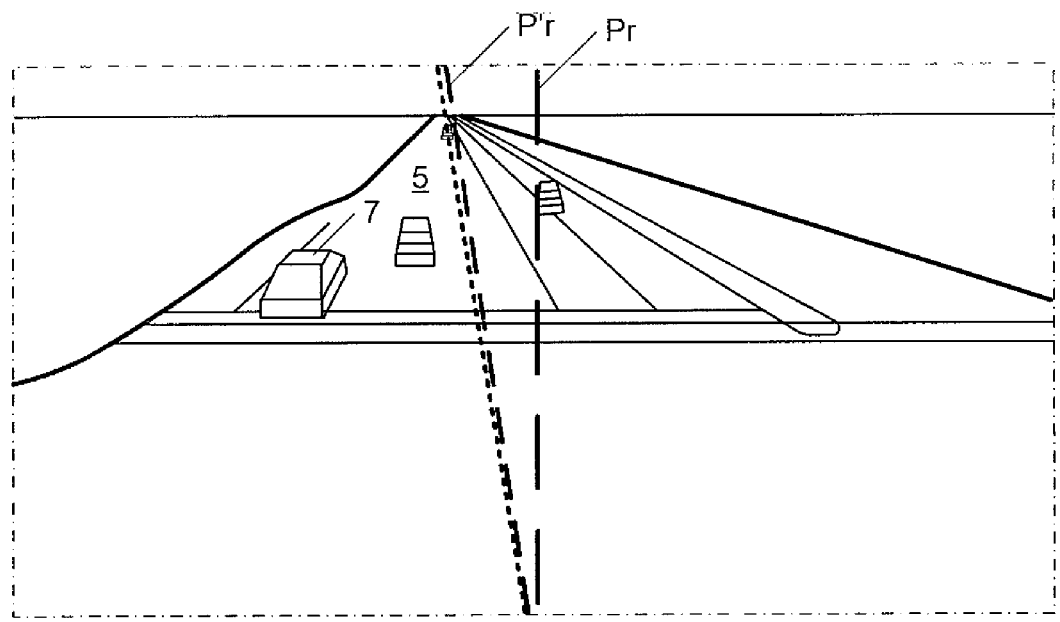
FIG. 10 illustrates a position of a vehicle in an image before calibration of radar data in accordance with an embodiment of the disclosure.
Figure 11:
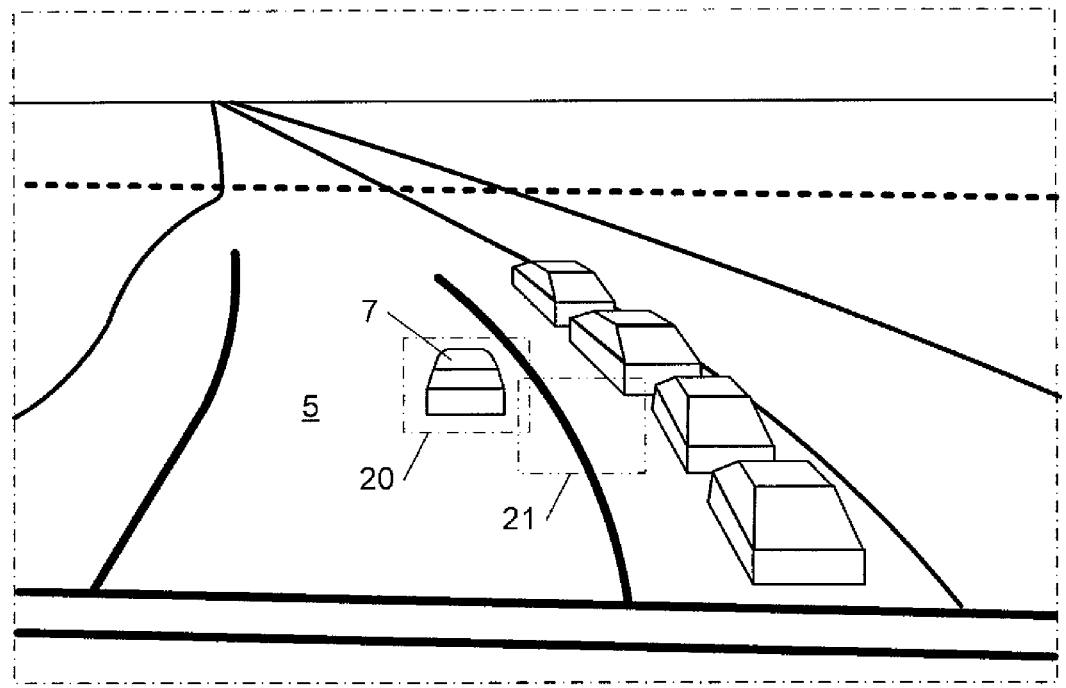
FIG. 11 illustrates a position of a vehicle in an image after calibration of radar data in accordance with an embodiment of the disclosure.

As the orientation angle θ of the radar has been determined, and since the radar and the camera are at a common location, the line pr can now be rotated on an angle θ corresponding to the determined orientation angle so as to obtain the line p'r as illustrated in FIG. 10. As the line p'r is in the image, the coordinates thereof with respect to the reference frame can be determined, so that a link is established between the radar data and the video images.

The sole problem which remains is that for the radar data the vanishing point is considered to be situated on p'r, whereas for the camera the vanishing point is considered to be situated on lc. This signifies that if a vehicle 20 is traced by the radar, the radar will issue coordinates with respect to the framework which will cause the vehicle to be on a position indicated by the strip 21, i.e. shifted with respect to its real position. This can however be easily corrected by the rotation of the central line lc over the orientation angle, thereby providing the corrected position of the vehicle.

In one embodiment, a method may comprise monitoring a traffic stream circulating on a road, wherein video images of said traffic stream are recorded by means of a camera and further data measured from vehicles being part of said traffic are collected by means of a further measurement member, said camera and said further measurement member being located at a common location offset with respect to a central axis of said road, said further measurement member having a field of view extending around a further measurement member central axis and said camera having a camera field of view extending around a camera central axis, and wherein said further measurement member is set up in such a manner that its field of view is situated within the field of view of the camera.

Said further measurement member may be oriented with respect to the camera so that their central axis of their field of view make a predetermined angle with respect to each other. Further measurement member coordinates of moving objects in a selected section of said image may be determined by said further measurement member, said further measurement member coordinates being transformed into further coordinates of an image reference frame and an identifier being displayed within said image portion at said further coordinates, characterized in that the further measurement member is formed by a radar.

Said method may comprise a calibration of said video images by setting camera parameters, in particular a focal distance of a camera lens of said camera, and scene parameters, in particular a height at which said camera is positioned with respect to said road, said calibration further comprising a selection of an image of said video images and a determination within said selected image of a horizon in an environment in which said road extends followed by drawing in said selected image of a substantially horizontal line at said horizon, based on said horizontal line, said camera parameters and said scene parameters, a reference frame for pixels composing said selected image being determined, an orientation angle indicating an angle between an axis extending along said road and a central axis of a radar beam emitted by said radar being determined by sampling subsequent positions on said road reached by a vehicle of said traffic stream travelling on said road, a line extending substantially vertically within a further selected image of said video images being drawn and coordinates for said line within said reference frame being determined, said line being thereafter rotated within said further selected image over an angle corresponding to said orientation angle.

In some embodiments, the method may be characterized in that said sampled subsequent positions (p1, p2, .pj, .pn) are situated on a road axis substantially parallel to said central axis, said sampling being executed at a predetermined sampling frequency, for each sampled position pj(j?1) a first (?sj) and a second (?s'j) distance being determined on the basis of a speed at which said sampled vehicle moves and said sampling frequency, whereas said first distance extends on said central axis of said radar beam and said second distance extends on said road axis, said orientation angle being determined on the basis of said first and second distances.

In a related embodiment, the method may be characterized in that n is at least equal to two, in particular equal to twenty. In another embodiments, the method may be characterized in that said orientation angle is determined by averaging over n−1 values. In various embodiments, the method may be characterized in that said reference frame is a geographical reference frame wherein said pixels are expressed in their world coordinates. The method may also be characterized in that said line, extending substantially vertically within a further selected image, extends substantially in a middle of said further selected image.

In other embodiments, a traffic monitoring device may comprise a radar module and a camera lodged in a housing, said radar having a radar field of view extending around a radar central axis and said camera having a camera field of view extending around a camera central axis. Said camera may be provided to form an image of objects situated within said camera field of view, said camera field of view being larger than said radar field of view, said radar and said camera being mounted with respect to each other in such a manner that said radar field of view is situated within said camera field of view.

Said radar and said camera may be, when operational, rigidly mounted with respect to each other, and wherein the radar and the camera are positioned with respect to each other so that their central axis of their field of view make a predetermined angle with respect to each other. Said radar may be provided for determining with respect to a radar coordinates reference frame coordinates of moving objects within said radar field of view. Said device may comprise selecting means provided for selecting within said image an image section representing at least part of said radar field of view. Said device may further comprise transformation means coupled to said selection means and provided for transforming said coordinates of said moving object within said image portion into further coordinates relative to an image reference frame and for displaying within said image portion an identifier at said further coordinates.

Said device may comprise calibration means provided for calibrating said video images by setting camera parameters, in particular a focal distance of a camera lens of said camera, and scene parameters, in particular a height at which said camera is positioned with respect to said road. Said calibration means may further comprise further selection means provided for selecting an image within said video images and for determining within said selected image a horizon in an environment in which said road extends and for drawing in said selected image of a substantially horizontal line at said horizon. Said calibration means may be further provided for determining based on said horizontal line a reference frame for pixels composing said selected image on the basis of said camera parameters and said scene parameters and for determining an orientation angle indicating an angle between an axis extending along said road and a central axis of a radar beam emitted by said radar by sampling subsequent positions on said road reached by a vehicle of said traffic stream travelling on said road. Said calibration means may be further provided for drawing a line extending substantially vertically within a further selected image of said video images and coordinates for said line within said reference frame and for rotating thereafter said line within said further selected image over an angle corresponding to said orientation angle.

In one embodiment, a traffic monitoring device may be characterized in that said reference frame of said radar is a world coordinates reference frame. A traffic monitoring device may also be characterized in that said predetermined angle is situated within −21° to 14° when in a vertical plane of said image and within −10° and 10° when in a horizontal plane of said image.

Any of the various methods, processes, and/or operations described herein may be performed by any of the various systems, devices, and/or components described herein where appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method for monitoring a traffic stream circulating on a road, the method comprising:
    collecting video images and data of said traffic stream, wherein the video images of said traffic stream are recorded by a camera and the data are measurements of vehicles of said traffic stream that are collected by a measurement member; and
    calibrating said video images to said data by:
    determining a reference frame for pixels composing a selected image, and determining an orientation angle indicating an angle between an axis extending along said road and a central axis of a measurement beam emitted by the measurement member by sampling subsequent positions on said road reached by a vehicle of said traffic stream travelling on said road.

2. The method of claim 1, wherein:
said camera and said measurement member are located at a common location offset with respect to a central axis of said road;
said measurement member comprises a field of view extending around a measurement member central axis and said camera comprises a camera field of view extending around a camera central axis;
said measurement member is set up in such a manner that its field of view is situated within the field of view of the camera; and
said measurement member is oriented with respect to the camera so that their central axes of their fields of view make a predetermined angle with respect to each other.

3. The method of claim 2, wherein:
measurement member coordinates of moving objects in a selected portion of said image are determined by said measurement member; and
said measurement member coordinates are transformed into coordinates of an image reference frame;
the method further comprising displaying an identifier within said image portion at said coordinates.

4. The method of claim 1, wherein:
the measurement member comprises a radar; and
the measurement beam comprises a radar beam.

5. The method of claim 1, wherein the calibrating comprises:
setting camera parameters and scene parameters;
determining a horizon within the selected image in an environment in which said road extends;
drawing, in said selected image, a substantially horizontal line at said horizon;
drawing a line extending substantially vertically within a further selected image of said video images being drawn; and
determining coordinates for said line within said reference frame, wherein said line is rotated within said further selected image over an angle corresponding to said orientation angle.

6. The method of claim 5, wherein:
said line, extending substantially vertically within a further selected image, extends substantially in a middle of said further selected image.

7. The method of claim 1, wherein:
said sampled subsequent positions (p1, p2, .pj, .pn) are situated on a road axis substantially parallel to said central axis, said sampling being executed at a predetermined sampling frequency, for each sampled position pj(j≠1) a first ($\Delta sj$) and a second ($\Delta s'j$) distance being determined on the basis of a speed at which said sampled vehicle moves and said sampling frequency, wherein said first distance extends on said central axis of said measurement beam and said second distance extends on said road axis, said orientation angle being determined on the basis of said first and second distances.

8. The method of claim 7, wherein:
n is at least equal to two, in particular equal to twenty.

9. The method of claim 7, wherein:
said orientation angle is determined by averaging over n−1 values.

10. The method of claim 1, wherein:
said reference frame is a geographical reference frame wherein said pixels are expressed in their world coordinates.

11. A traffic monitoring device for monitoring a traffic stream circulating on a road, the device comprising:
a radar module and a camera lodged in a housing, wherein said camera is adapted to form an image of objects situated within a camera field of view, and said radar is adapted to determine, with respect to a radar coordinates reference frame, coordinates of moving objects within a radar field of view; and
a calibration means adapted to calibrate said video images to the radar by:
setting camera parameters and scene parameters,
determining a reference frame for pixels composing a selected image on the basis of said camera parameters and said scene parameters, and
determining an orientation angle indicating an angle between an axis extending along said road and a central axis of a radar beam emitted by said radar by sampling subsequent positions on said road reached by a vehicle of said traffic stream travelling on said road.

12. The device of claim 11, wherein:
said radar comprises the radar field of view extending around a radar central axis;
said camera comprises the camera field of view extending around a camera central axis;
said camera field of view being larger than said radar field of view;
said radar and said camera being mounted with respect to each other in such a manner that said radar field of view is situated within said camera field of view;
said radar and said camera are, when operational, rigidly mounted with respect to each other; and
wherein the radar and the camera are positioned with respect to each other so that their central axis of their field of view make a predetermined angle with respect to each other.

13. The device of claim 12, wherein:
said predetermined angle is situated within −21° to 14° when in a vertical plane of said image and within −10° and 10° when in a horizontal plane of said image.

14. The device of claim 11, further comprising:
selecting means adapted to select within said image an image section representing at least part of said radar field of view; and
transformation means coupled to said selection means and adapted to transform said coordinates of said moving object within said image portion into further coordinates relative to an image reference frame and for displaying within said image portion an identifier at said further coordinates.

15. The device of claim 11, wherein:
said calibration means is adapted to draw a line extending substantially vertically within a further selected image of said video images and coordinates for said line within said reference frame and for rotating thereafter said line within said further selected image over an angle corresponding to said orientation angle.

16. The device of claim 11, wherein:
said reference frame of said radar is a world coordinates reference frame.

* * * * *